(12) United States Patent
Raizman-Kedar et al.

(10) Patent No.: US 12,326,934 B2
(45) Date of Patent: Jun. 10, 2025

(54) DETECTING SUSPICIOUS ACTIVATION OF AN APPLICATION IN A COMPUTER DEVICE

(71) Applicant: International Business Machines Corporation, Armonk, NY (US)

(72) Inventors: Einav Raizman-Kedar, Kiryat Ono (IL); Ofer Benyamin Sasson, Ramat Gan (IL); Nethanella Messer, Kiryat Ata (IL); Matan Elbaz Ziv, Ramat Gan (IL)

(73) Assignee: International Business Machines Corporation, Armonk, NY (US)

( * ) Notice: Subject to any disclaimer, the term of this patent is extended or adjusted under 35 U.S.C. 154(b) by 254 days.

(21) Appl. No.: 17/130,180

(22) Filed: Dec. 22, 2020

(65) Prior Publication Data

US 2022/0198013 A1 Jun. 23, 2022

(51) Int. Cl.
*G06F 21/56* (2013.01)
*G06F 21/55* (2013.01)

(52) U.S. Cl.
CPC .......... *G06F 21/566* (2013.01); *G06F 21/554* (2013.01); *G06F 2221/033* (2013.01)

(58) Field of Classification Search
CPC . G06F 21/566; G06F 21/554; G06F 2221/033
See application file for complete search history.

(56) References Cited

U.S. PATENT DOCUMENTS 9,413,774 B1 * 8/2016 Liu .................. G06F 21/566
10,685,355 B2 6/2020 Novick et al.
2011/0321139 A1 * 12/2011 Jayaraman ............. G06F 21/53
    726/4
2016/0232352 A1 * 8/2016 Chen .................. G06F 21/316
2017/0054702 A1 2/2017 Turgeman
2020/0302058 A1 * 9/2020 Kenyon ............... G06F 21/554
2021/0312077 A1 * 10/2021 Jain .................... G06F 21/46
2021/0367959 A1 * 11/2021 Soryal ............... H04L 63/1425

OTHER PUBLICATIONS

Mobile Remote Access Trojan (aka RAT); https://xtn-lab.com/mobile-rat/;published May 30, 2019.
AndroRAT; https://www.zemana.com/removal-guide/prevent-androrat-hacking; published in Zemana, printed Aug. 20, 2020.
Detecting Remote Access (RAT) Attacks on Online Banking Sites; https://informationsecurity.report/Resources/Whitepapers/bbb3b0fb-9ba1-4602-8cec-17dcb2381892_detecting-remote-access-attacks-on-online-banking-sites-pdf-7-w-1088.pdf; published in BioCatch, Created Jul. 3, 2014.
Anatoli Kalysch et al., How Android's UI Security is Undermined by Accessibility; ROOTS 18, Nov. 29-30, 2018, Vienna, Austria.

* cited by examiner

*Primary Examiner* — Jeffrey D. Popham
(74) *Attorney, Agent, or Firm* — Randy Tejeda

(57) ABSTRACT

A computer-based system and method for detecting suspicious activation of an application in a computer device, including: monitoring physical activation events by the computer device; identifying a software activation event in the computer device; determining whether a physical activation event corresponding to the software activation event has been detected; and determining that the software activation event is legitimate if the corresponding physical activation event has been detected at the computer device and determining that the software activation event is suspicious otherwise. The physical activation events may be touch events and the software activation event may be a click event.

15 Claims, 3 Drawing Sheets

DETECTING SUSPICIOUS ACTIVATION OF AN APPLICATION IN A COMPUTER DEVICE

FIELD OF THE INVENTION

The present invention relates generally to detecting suspicious activation of an application in a computer device, and specifically, to detecting suspicious activation of an application through the accessibility services.

BACKGROUND

In recent years, computing and mobile device security and protection against malware attacks have been increasingly growing in importance. As the dependency of people upon computing devices and mobile devices grows, the use of such devices for important and sensitive operations as well as the retention of private and valuable information on such devices grow accordingly. This presents an opportunity for hackers and malicious organizations to invade the privacy of the computing and mobile device users, hijack or secretively take control of the devices and potentially cause harm.

Accessibility services are provided by some operating systems, e.g., the ANDROID™ (ANDROID is a trademark of Google LLC) system, to assist users with disabilities, or users who are for some reason unable to fully interact with the device, in using the device and its applications. For example, blind people, or users who are currently driving and cannot look at the screen of the smartphone, may operate the smartphone by providing vocal instructions using the accessibility services. Some operating systems provide wide capabilities to these accessibility services to enable them to operate the device on behalf of the user. For example, if a user grants accessibility service permission to an application, then the accessibility service may run in the background, read the user interface, read notifications coming from other applications, perform click or selection operations, change a state of a checkbox, write text into a textbox, etc. Most applications use those capabilities legitimately. However, some hackers or malicious entities may perform what is known as accessibility attacks by using the accessibility tools to gain control over computer devices and smartphones and perform actions on behalf of the user, without user awareness. For example, an attacker may perform a bank transfer on behalf of the user, without the user being aware of any unusual activity. Unfortunately, such accessibility attacks are gaining popularity with devastating results.

Therefore, a method for detecting accessibility attacks is required.

SUMMARY

According to embodiments of the invention, a system and method for detecting suspicious activation of an application in a computer device may include: monitoring physical activation events by the computer device; identifying a software activation event in the computer device; determining whether a physical activation event corresponding to the software activation event has been detected; and determining that the software activation event is legitimate if the corresponding physical activation event has been detected at the computer device and determining that the software activation event is suspicious otherwise.

According to embodiments of the invention, the operating system of the computer device may be ANDROID operating system.

According to embodiments of the invention, the physical activation events may be touch events.

According to embodiments of the invention, detecting the physical activation events may be performed by monitoring at least one of onTouch, onKeyDown or onKeyUp event listeners.

According to embodiments of the invention, the software activation event may be a click event.

According to embodiments of the invention, identifying the software activation event may include monitoring at least one of onClick, onFocusChange or onLayoutChange event listeners.

According to embodiments of the invention, it may be determined that a physical activation event corresponding to the software activation event has been detected if a physical activation event that precedes the software activation event by a time difference that is below a threshold has been detected.

Embodiments of the invention may include scanning the device for malware if the software activation event is suspicious.

Embodiments of the invention may include providing a notification to a user if the software activation event is suspicious.

According to embodiments of the invention, monitoring the physical activation events by the computer device and identifying the software activation event in the computer device may be performed by a monitoring component of the application.

According to embodiments of the invention, a system and method for detecting abuse of an accessibility service for a computer device, may include: monitoring the computer device for touch events; identifying a click event on a computer device; and evaluating the click event with relation to the touch events to detect the accessibility service abuse.

BRIEF DESCRIPTION OF THE DRAWINGS

The subject matter regarded as the invention is particularly pointed out and distinctly claimed in the concluding portion of the specification. Embodiments of the invention, however, both as to organization and method of operation, together with objects, features and advantages thereof, may best be understood by reference to the following detailed description when read with the accompanied drawings. Embodiments of the invention are illustrated by way of example and not limitation in the figures of the accompanying drawings, in which like reference numerals indicate corresponding, analogous or similar elements, and in which:

Figure 1:
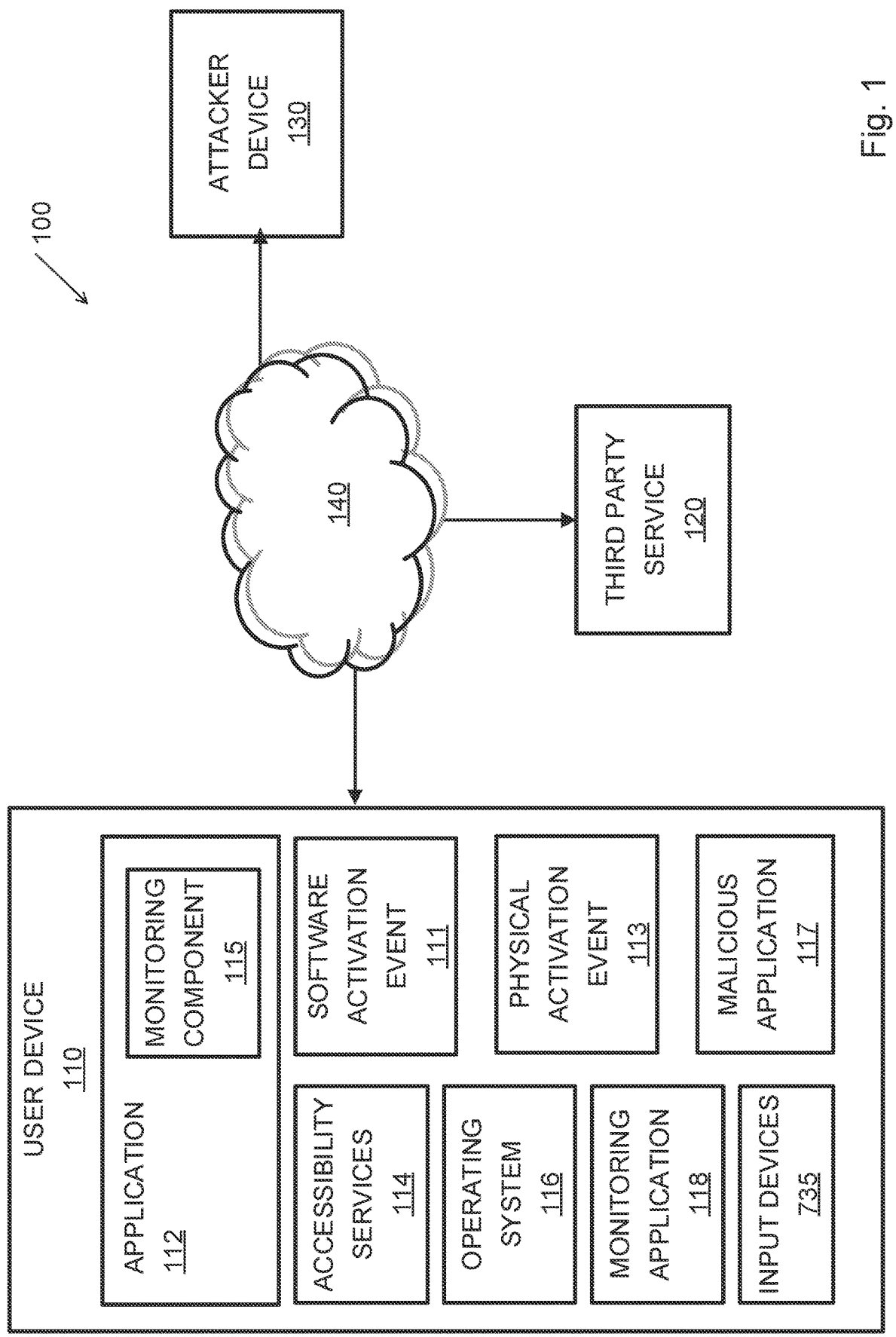
FIG. 1 depicts a computer network, helpful in demonstrating embodiments of the invention.

It will be appreciated that for simplicity and clarity of illustration, elements shown in the figures have not necessarily been drawn to scale. For example, the dimensions of some of the elements may be exaggerated relative to other elements for clarity. Further, where considered appropriate, reference numerals may be repeated among the figures to indicate corresponding or analogous elements.

DETAILED DESCRIPTION

In the following description, various aspects of the present invention will be described. For purposes of explanation, specific configurations and details are set forth in order to provide a thorough understanding of the present invention. However, it will also be apparent to one skilled in the art that the present invention may be practiced without the specific details presented herein. Furthermore, well known features may be omitted or simplified in order not to obscure the present invention.

Although some embodiments of the invention are not limited in this regard, discussions utilizing terms such as, for example, "processing," "computing," "calculating," "determining," "establishing", "analyzing", "checking", or the like, may refer to operation(s) and/or process(es) of a computer, a computing platform, a computing system, or other electronic computing device that manipulates and/or transforms data represented as physical (e.g., electronic) quantities within the computer's registers and/or memories into other data similarly represented as physical quantities within the computer's registers and/or memories or other information transitory or non-transitory or processor-readable storage medium that may store instructions, which when executed by the processor, cause the processor to execute operations and/or processes. Although embodiments of the invention are not limited in this regard, the terms "plurality" and "a plurality" as used herein may include, for example, "multiple" or "two or more". The terms "plurality" or "a plurality" may be used throughout the specification to describe two or more components, devices, elements, units, parameters, or the like. The term "set" when used herein may include one or more items unless otherwise stated. Unless explicitly stated, the method embodiments described herein are not constrained to a particular order or sequence. Additionally, some of the described method embodiments or elements thereof can occur or be performed in a different order from that described, simultaneously, at the same point in time, or concurrently.

Reference is made to FIG. 1, depicting a computer network or system 100, helpful in demonstrating embodiments of the invention. It should be understood in advance that the components, and functions shown in FIG. 1 are intended to be illustrative only and embodiments of the invention are not limited thereto.

Networks 140 may include any type of network or combination of networks available for supporting communication between user device 110 and third-party service 120. Networks 140 may be abused by attacker devices 130 that may attack user device 110 through network 140. Networks 140 may include for example, a wired, wireless, fiber optic, or any other type of connection, a local area network (LAN), a wide area network (WAN), the Internet and intranet networks, etc. Third-party service 120 may include any application or service provided to user device 110, such as banking applications, online stores and other payment applications, social networks applications etc.

According to embodiments of the invention, user device 110 may include an attacking or malicious application 117, e.g., malicious application 117 may be installed on user device 110. Typically, the user of user device 110 may not be aware of malicious application 117. Malicious application 117 may attack application 112 using accessibility services 114, e.g., malicious application 117 may activate application 112 without the user knowledge or approval through accessibility services 114. Malicious application 117 may be self-contained, e.g., self-operated, or may be controlled and operated by attacker device or service 130. Malicious application 117 may be installed by an attacker device or service 130 or in any other manner. For example, remote access tool or remote access trojan (RAT) may be implemented by attacker device or service 130 to deliver malicious application 117 to user device 110. However, other attacking malwares and methods with the capability to abuse the accessibility service 114 of user device 110 may be used.

User device 110 may be or may include any computing device (e.g., computing device 700 depicted in FIG. 3) that is associated with a user and includes network connectivity and accessibility service 114, for example, a smartphone. User device 110 may include applications such as application 112, that may be executed by user device 110, and enable the user to communicate with other computer services or applications, such as third-party service 120, and to perform actions, such as purchases, bank transfers etc., as known in the art.

User device 110 may provide accessibility suite, tools or services 114, e.g., software intended to assist users with disabilities, or users who are unable to fully interact with user device 110, in using user device 110 and its applications 112. Accessibility services 114 may include various capabilities to aid and assist users with disabilities. For example, accessibility services 114 may enable controlling the user interface (UI) e.g., to cause application 112 to appear in high contrast view, may enable automatic reading of the texts and operations of application 112 and may enable controlling application 112 using voice commands, to help a user with visual impairments. Specifically, accessibility services 114 may include software applications and tools that may provide a range of capabilities to perform actions on behalf of the user, e.g., to activate application 112 by performing actions such as read the user interface, read notifications coming from application 112, perform actions such as click operations, changing a state of a checkbox, inserting text into a textbox, etc. When used legitimately, accessibility services 114 may enable users who are unable to fully interact with user device 110 to activate application 112.

Accessibility services 114 may be abused by malicious entities, such as malicious application 117, to gain control over user device 110 and perform actions on behalf of the user, without the user awareness or approval. For example, malicious application 117 may take hold of the user's bank application credentials such as username and password by spying on the user, and activate application 112 through accessibility services 114 to order third-party service 120 to perform, for example a bank transfer on behalf of the user, without the user being aware of any unusual activity.

According to some embodiments of the invention, user device 110 may be operated by an operating system that may be configured to include encapsulated virtual environments, known as sandboxes designated by a unique user identification number (UID). Such operating systems may include the ANDROID operating system. For example, each application 112 may have its own sandbox and UID, with limited access to utilities and resources of operating system 116 and user device 110. Sandboxes may include a software structure meant to isolate applications from each other and form resources of user device 110. An application may gain access to other applications or resources based on permissions only. For example, application 112 may be limited to use its own memory resources without having access to other memory resources, sandboxes of other applications, and other resources of user device 110. Typically, the access limitations and permissions are defined by the operating system and approved or disapproved by the user during installation of the application or during the application life cycle. Thus, application 112 may have access to some utilities and resources but not to others.

In some use cases, malicious application 117 may be able to operate application 112 through accessibility service 114. For example, in some use cases, the ability to use accessibility service 114 may be given upon user consent or permission provided to an application, for example malicious application 117, to use accessibility service 114. Once the permission to use accessibility service 114 is provided to malicious application 117, malicious application 117 may abuse this permission to manipulate application 112. In this case, application 112 may be unaware to the possibility that another application (e.g., malicious application 117) is able to manipulate application 112. Therefore, a user may legitimately operate application 112 using accessibility services 114, or malicious application 117 may illegitimately operate application 112 using accessibility services 114.

Thus, monitoring of accessibility services 114 may be required. However, due to the sandbox design of many operating systems, and specifically of the ANDROID operating system, directly accessing accessibility services 114 by another application may not be feasible. Additionally, in ANDROID operating system, gaining access to the settings of accessibility services 114 (or any other application) by another application, e.g., application 112 or monitoring application 118, may require special level of permissions, referred to as root permissions or super user permissions, which are typically not the default for users of an ANDROID operating system. Thus, a monitoring application 118 or application 112 may not be able to directly monitor accessibility services 114 to detect if malicious application 117 is abusing accessibility services 114 to manipulate application 112. Under sandboxing, any application, including application 112 and monitoring application 118, may only monitor itself.

According to embodiments of the present invention, usage of accessibility services 114 may be monitored, and a notification may be provided in case accessibility services 114 are used. According to embodiments of the present invention, usage of accessibility services 114 may be monitored by application 112. For example, a monitoring component 115 may be added or inserted into application 112, and usage of accessibility services 114 may be monitored by monitoring component 115. According to embodiments of the present invention, monitoring component 115 may monitor and detect usage of accessibility services 114 from within application 112 itself, by identifying software activation events 111 of user device 110 that is not initiated or preceded by a corresponding physical activation event 113.

A software activation event 111 may refer to a software indication or message of or describing commands or actions originating from the user interface (UI) and obtained at or provided to application 112, e.g., by operating system 116. For example, a software activation event 111 may include indication of click events, e.g., a software indication that button or other control—including a virtual button or control displayed on a screen that may be clicked or pressed has been activated or clicked, and detection of this may be made by application 112 or by operating system 116, which then transmits or raises software activation event 111. In some operating systems, e.g., the ANDROID system, click events may be represented by onClick events. Other events may be used to indicate a software activation event 111. For example, onFocusChange event (indicating a change in a focus state of a view), and/or onLayoutChange (indicating a change in a layout bounds of a view), may be used to indicate a software activation event 111.

A physical activation event 113 may refer to a software indication of a user performing a physical action sensed by user device 110. For example, the physical action initiating the physical activation event 113 may include touch events (e.g. a user's physical action relative to a device) such as a user press of a control or button (e.g., virtual button) on user device 110, a release of the control or button, or any movement gesture made physically by the user on input device 735, e.g., a screen of user device 110. In some operating systems, e.g., the ANDROID system, physical actions may be represented by, raise or activate onTouch events. Other events may be used to indicate a physical activation event 113. For example, pressing on the keyboard on some UI elements may raise onKeyDown and/or onKeyUp events, etc.

Some operating systems provide tools for monitoring software activation events 111 and physical activation events 113. For example, the ANDROID operating system provides event listeners for monitoring onClick and onTouch events. Thus, a service or an application may monitor software activation events 111 and physical activation events 113 of user device 110 using the event listeners.

A known approach for preventing accessibility attacks requires ignoring software activation events 111 and activating application 112 based on physical activation events 113 only, e.g., using onTouch event listeners or other listeners related to a user physically touching the device. While this approach may prevent accessibility attacks, it may at the same time prevent legitimate use of accessibility services 114. Therefore, this approach may not be applicable to many applications (e.g., banking applications) that wish to or are required to support activation of their applications by accessibility services 114, to enable operation of application 112 by users with disabilities through legitimate use of accessibility services 114.

According to embodiments of the invention, a service or an application may monitor software activation events 111 and physical activation events 113 and identify usage of accessibility services 114 in case an identified software activation event 111 is not preceded by a corresponding physical activation event 113.

Figure 2:
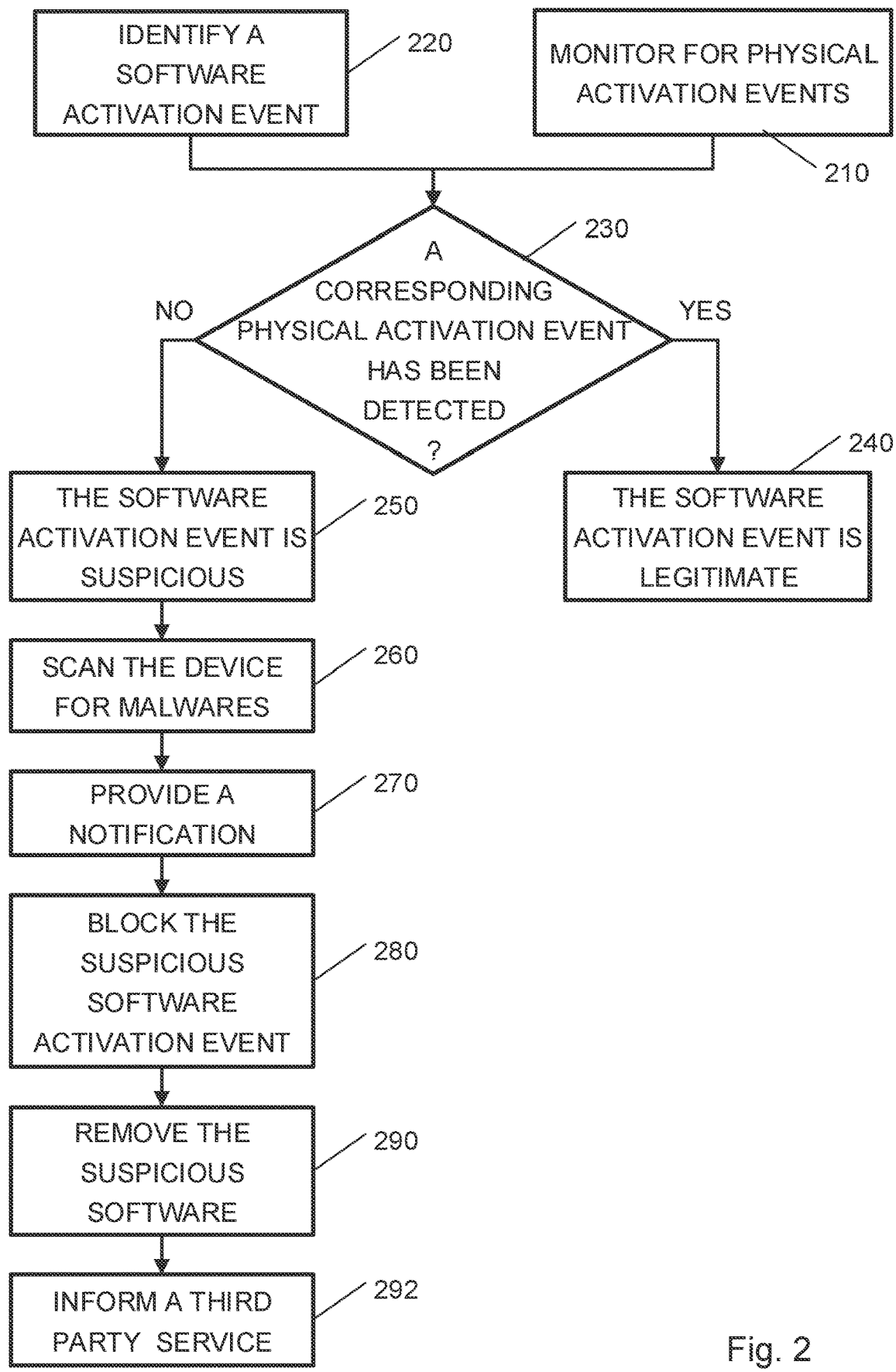
FIG. 2 is a flowchart of a method for detecting suspicious activation of an application in a computer device, according to embodiments of the invention.

Reference is made to FIG. 2, which is a flowchart of a method for detecting suspicious activation of an application in a computer device, according to embodiments of the invention. An embodiment of a method for detecting suspicious activation of an application in a computer device may be performed, for example, by the systems shown in FIGS. 1 and 3.

In operation 210, a client application (e.g., monitoring component 115 of application 112) executed by a user device (e.g., user device 110) may monitor physical activation events on user device 110. Monitoring physical activation events may include detecting physical activation events and recording the timing of the detected physical activation events. Monitoring physical activation events may be performed using any applicable method available by the operating system of the user device to detect and record the timing of physical activation events. For example, the ANDROID operating system may provide Reflection library components, which allow access to information about UI activities. In some embodiments, specific event listeners, such as onTouch, onKeyDown, onKeyUp or other event listeners may be used to record timing of physical activation events. In some embodiments, a dedicated application programming interface (API) may be used to detect and record the timing of the physical activation events.

In operation 220, a client on a user device may identify a software activation event on user device 110. Identifying a software activation event may include detecting and recording the timing of a software activation event. Identifying a software activation event may be performed using any applicable method available by the operating system of the user device to detect and record the timing of the software activation event. For example, ANDROID operating system may provide Reflection library components, which allows access to information about software activation activities. In some embodiments, specific event listeners, such as onClick event listeners may be used to record timing of the software activation event. In some embodiments, a dedicated application programming interface (API) may be used to detect and record the timing of the software activation event.

In operation 230, it may be determined whether or not a physical activation event corresponding to the software activation event has been detected. Typically, physical activation event corresponding to, related to, or associated with a software activation event means that the software event is the eventual cause of the physical event, and that they may be related by a time relationship. In some embodiments, the software activation event (e.g., a click event) may be evaluated with relation to the physical activation events (e.g., touch events). For example, it may be determined that a physical activation event corresponding to the software activation event has been detected if a physical activation event that precedes the software activation event by a time difference that is below a threshold or duration has been detected. For example, the timing (e.g. time of occurrence or timestamp) of the software activation event may be compared with the timing of the last detected physical activation event (e.g., the last physical activation event detected before the software activation event). If the time difference between the software activation event and the last detected physical activation event is equal to or above a threshold, then it may be determined that those events are not related. However, if the time difference is below a threshold then it may be determined that the last detected physical activation event and the software activation event are related, e.g., that the software activation event is a result of the physical activation event.

If it is determined in operation 230 that a physical activation event corresponding to the software activation event has been detected, then it may be concluded that the software activation event is legitimate or non-malicious, as indicated in operation 240. Specifically, it may be concluded in operation 240 that the software activation event is a result of a physical activation event, e.g., that the user has physically interacted with user device, for example by physically touching the screen of the user device, to generate the physical activation event and the corresponding software activation event. Furthermore, it may be determined in operation 240 that the accessibility services were not used to generate the detected software activation event.

Otherwise, if it is determined in operation 230 that a physical activation event has not been detected, that corresponds to the software activation event that has been detected, then it may be concluded that the software activation event is suspicious, as indicated in operation 250. This may indicate accessibility service use or abuse. Specifically, it may be concluded in operation 250 that the software activation event is not a result of a physical activation event. In the absence of a physical activation event corresponding to the software activation event, it may be determined in operation 250 that the software activation event detected in operation 220 was generated (legitimately or illegitimately) by the accessibility services. Since, at this stage it is not known whether the identified software activation event is a result of a legitimate use of the accessibility services or is a result of an illegitimate accessibility attack, the software activation event may be marked in operation 250 as suspicious as being malicious or not legitimate. It may be noted that in some embodiments further analysis may be performed to determine the legitimacy of the software activation event detected in operation 220. For example, the identity of the application generating the software activation event may be compared against a list of trusted applications, e.g., a list of applications that use the accessibility services and are known as trusted, or against a list of known malwares, e.g., a list of applications that use the accessibility services and are known as malwares. If the application generating the software activation event is found in the list of trusted applications, it may be determined that the application generating the software activation event is legitimate, and if the application generating the software activation event is found in the list of known malwares, it may be determined that the application generating the software activation event is a malware.

In operation 260, the user device may be scanned for malwares in case a software activation event has been marked in operation 250 as suspicious. According to some embodiments, a cooldown mechanism may be applied to prevent frequent scanning for malwares. Thus, if a scan for malware has been performed, the user device will not be scanned again for malwares during a cooldown period, even if another suspicious software activation events are detected within the cooldown period.

In operation 270, a notification regarding the suspicious software activation event may be provided, either to the user, through the user device or to a third party, e.g., to third-party service 120.

In operation 280, the suspicious software activation event may be blocked, e.g., prevented. For example, the operation that should have been performed by the software activation event may be canceled. In operation 290, the attacking or malicious application (e.g., malicious application 117) may be terminated or removed, e.g., uninstalled from user device 110, for example by monitoring application 118. In operation 292, a third-party service, e.g., third-party service 120, may be informed of the suspicious software activation event. For example, if the attached application is a banking application, a banking service may be informed of the suspicious software activation event. The third-party service may change or adjust the services and permissions provided to the attacked application based on the notification. For example, a banking application may continue to allow viewing the account information by the attacked application but may not allow the attacked application to perform money transfers.

Embodiments of the present invention may detect suspicious software activation events, e.g., software activation events that are generated by the accessibility tools. Such suspicious software activation events may be legitimate is some cases. However, suspicious software activation events may serve as an indication to a possible accessibility attack. Therefore, embodiments of the invention improve the technology of computer security and malware detection by providing a tool for detecting possible accessibility attacks.

Figure 3:
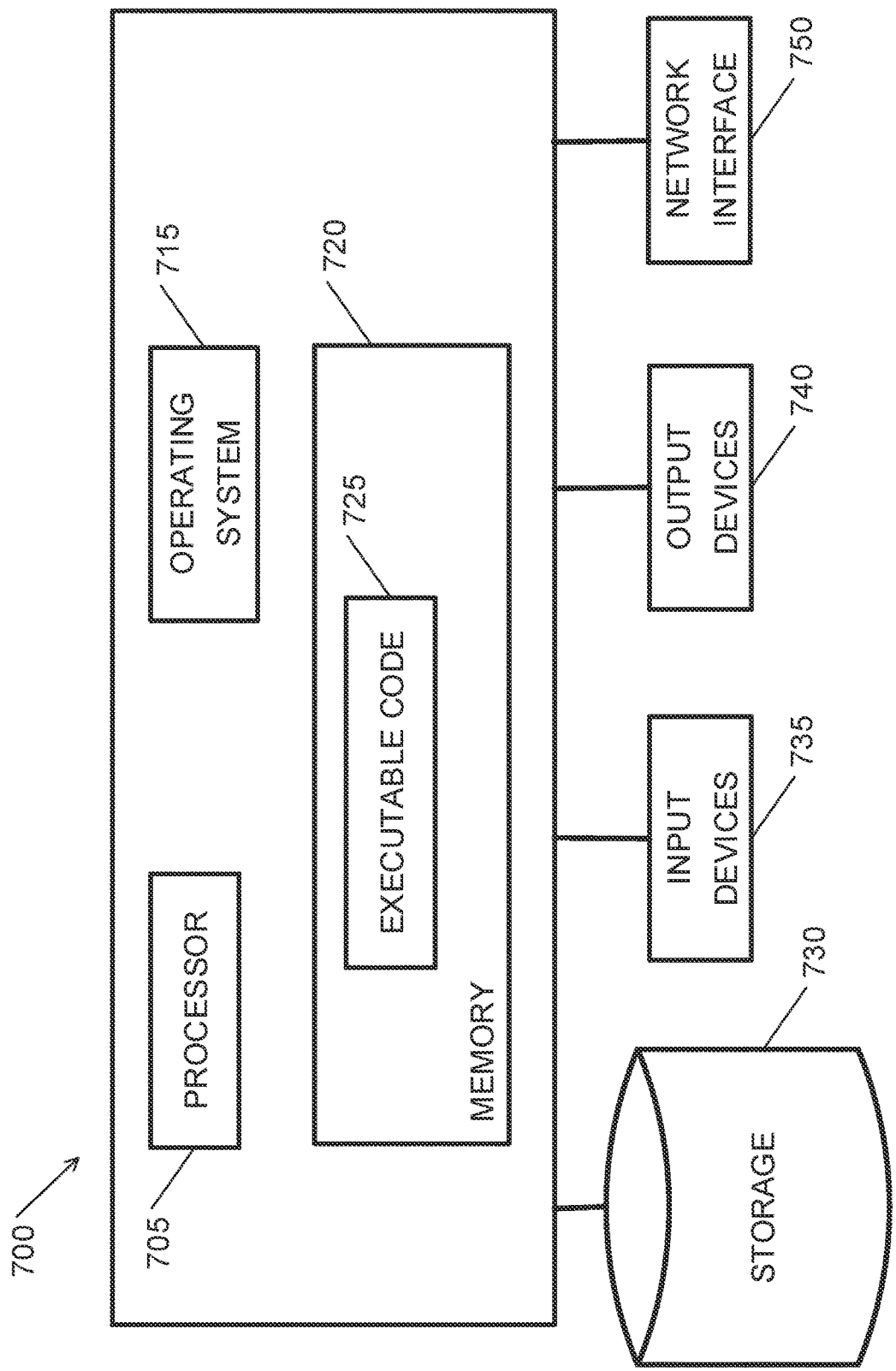
FIG. 3 illustrates an example computing device according to an embodiment of the invention.

FIG. 3 illustrates an example computing device according to an embodiment of the invention. Various components such as user device 110 may be or include computing device 700 or may include components such as shown in FIG. 3. For example, a computing device 700 with a processor 705 may be used to detecting suspicious activation of an application in a computer device, according to embodiments of the invention.

Computing device 700 may include a processor 705 that may be, for example, a central processing unit processor (CPU), a chip or any suitable computing or computational device, an operating system 715, a memory 720, a storage 730, input devices 735 and output devices 740. Processor 705 may be or include one or more processors, etc., co-located or distributed.

Operating system 715 may be or may include any code segment designed and/or configured to perform tasks involving coordination, scheduling, arbitration, supervising, controlling or otherwise managing operation of computing device 700, for example. Operating system 715 may be a commercial operating system, such as the ANDROID system. Memory 720 may be or may include, for example, a Random Access Memory (RAM), a read only memory (ROM), a Dynamic RAM (DRAM), a Synchronous DRAM (SD-RAM), a double data rate (DDR) memory chip, a Flash memory, a volatile memory, a non-volatile memory, a cache memory, a buffer, a short term memory unit, a long term memory unit, or other suitable memory units or storage units. Memory 720 may be or may include a plurality of possibly different memory units.

Executable code 725 may be any executable code. e.g., an application, a program, a process, task or script. Executable code 725 may be executed by processor 705 possibly under control of operating system 715. For example, executable code 725 may be or include software for detecting suspicious activation of an application in a computer device, according to embodiments of the invention. In some embodiments, more than one computing device 700 may be used. For example, a plurality of computing devices that include components similar to those included in computing device 700 may be connected to a network and used as a system.

Storage 730 may be or may include, for example, a hard disk drive, a floppy disk drive, a Compact Disk (CD) drive, a CD-Recordable (CD-R) drive, a universal serial bus (USB) device or other suitable removable and/or fixed storage unit. In some embodiments, some of the components shown in FIG. 6 may be omitted. For example, memory 720 may be a non-volatile memory having the storage capacity of storage 730. Accordingly, although shown as a separate component, storage 730 may be embedded or included in memory 720.

Input devices 735 may be or may include a mouse, a keyboard, a touch screen or pad or any suitable input device. It will be recognized that any suitable number of input devices may be operatively connected to computing device 700 as shown by block 735. Output devices 740 may include one or more displays, speakers and/or any other suitable output devices. It will be recognized that any suitable number of output devices may be operatively connected to computing device 700 as shown by block 740. Any applicable input/output (I/O) devices may be connected to computing device 700 as shown by blocks 735 and 740. For example, a wired or wireless network interface card (NIC), a modem, printer or facsimile machine, a universal serial bus (USB) device or external hard drive may be included in input devices 735 and/or output devices 740. Network interface 750 may enable device 700 to communicate with one or more other computers or networks. For example, network interface 750 may include a Wi-Fi or Bluetooth device or connection, a connection to an intranet or the internet, an antenna etc.

Embodiments described in this disclosure may include the use of a special purpose or general-purpose computer including various computer hardware or software modules, as discussed in greater detail below.

Embodiments within the scope of this disclosure also include computer-readable media, or non-transitory computer storage medium, for carrying or having computer-executable instructions or data structures stored thereon. The instructions when executed may cause the processor to carry out embodiments of the invention. Such computer-readable media, or computer storage medium, can be any available media that can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or any other medium which can be used to carry or store desired program code means in the form of computer-executable instructions or data structures and which can be accessed by a general purpose or special purpose computer. When information is transferred or provided over a network or another communications connection (either hardwired, wireless, or a combination of hardwired or wireless) to a computer, the computer properly views the connection as a computer-readable medium. Thus, any such connection is properly termed a computer-readable medium. Combinations of the above should also be included within the scope of computer-readable media.

Computer-executable instructions comprise, for example, instructions and data which cause a general-purpose computer, special purpose computer, or special purpose processing device to perform a certain function or group of functions. Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

As used herein, the term "module" or "component" can refer to software objects or routines that execute on the computing system. The different components, modules, engines, and services described herein may be implemented as objects or processes that execute on the computing system (e.g., as separate threads). While the system and methods described herein are preferably implemented in software, implementations in hardware or a combination of software and hardware are also possible and contemplated. In this description, a "computer" may be any computing system as previously defined herein, or any module or combination of modulates running on a computing system.

For the processes and/or methods disclosed, the functions performed in the processes and methods may be implemented in differing order as may be indicated by context. Furthermore, the outlined steps and operations are only provided as examples, and some of the steps and operations may be optional, combined into fewer steps and operations, or expanded into additional steps and operations.

The present disclosure is not to be limited in terms of the particular embodiments described in this application, which are intended as illustrations of various aspects. Many modifications and variations can be made without departing from its scope. Functionally equivalent methods and apparatuses within the scope of the disclosure, in addition to those enumerated, will be apparent to those skilled in the art from the foregoing descriptions. Such modifications and variations are intended to fall within the scope of the appended claims. The present disclosure is to be limited only by the terms of the appended claims, along with the full scope of equivalents to which such claims are entitled. It is also to be understood that the terminology used in this disclosure is for the purpose of describing particular embodiments only, and is not intended to be limiting.

This disclosure may sometimes illustrate different components contained within, or connected with, different other components. Such depicted architectures are merely exemplary, and many other architectures can be implemented which achieve the same or similar functionality.

Aspects of the present disclosure may be embodied in other forms without departing from its spirit or essential characteristics. The described aspects are to be considered in all respects illustrative and not restrictive. The claimed subject matter is indicated by the appended claims rather than by the foregoing description. All changes which come within the meaning and range of equivalency of the claims are to be embraced within their scope.

What is claimed is:

1. A method for detecting suspicious activation of an application in a computer device, the method comprising:
   detecting a software activation event and a software activation event timestamp in the computer device;
   detecting a physical activation event and a physical activation timestamp by the computer device;
   determining the physical activation event does not correspond with the detected software activation event based on a time difference associated with comparing the software activation event timestamp and the physical activation timestamp exceeding a threshold;
   responsive to determining the physical activation event does not correspond to the detected software activation event, determining the software activation event as a suspicious activation, comprising:
      comparing the application to a list of trusted applications that utilize accessibility services associated with the computer device;
   responsive to determining that the software activation event is a suspicious activation, scanning the computer device for malware;
   applying a cooldown mechanism preventing a subsequent malware scan responsive to another suspicious activation during a cooldown period; and
   adjusting one or more permissions associated with the application based on the suspicious activation.

2. The method of claim 1, wherein an operating system of the computer device is ANDROID operating system.

3. The method of claim 1, wherein the physical activation event is a touch event.

4. The method of claim 1, wherein detecting the physical activation event is performed by monitoring at least one event listener selected from a group consisting of: onTouch, onKeyDown, and onKeyUp.

5. The method of claim 1, wherein the software activation event is a click event.

6. The method of claim 1, wherein detecting the software activation event comprises monitoring at least one event listener selected from a group consisting of: onClick, onFocusChange, and onLayoutChange.

7. The method of claim 1, comprising responsive to the suspicious activation, providing a notification to a user.

8. The method of claim 1, wherein detecting the physical activation event by the computer device and detecting the software activation event in the computer device is performed by a monitoring component of the application.

9. A system for detecting suspicious activation of an application, the system comprising:
   a memory; and
   a processor configured to:
      detect a software activation event and a software activation event timestamp in the computer device;
      detect a physical activation event and a physical activation timestamp by the computer device;
      determine the physical activation event does not correspond with the detected software activation event based on a time difference associated with comparing the software activation event timestamp and the physical activation timestamp exceeding a threshold;
      responsive to determining the physical activation event does not correspond to the detected software activation event, determine the software activation event as a suspicious activation, comprising:
         comparing the application to a list of trusted applications that utilize accessibility services associated with the computer device;
      responsive to determining that the software activation event is a suspicious activation, scan the computer device for malware;
      apply a cooldown mechanism preventing a subsequent malware scan responsive to another suspicious activation during a cooldown period; and
      adjust one or more permissions associated with the application based on the suspicious activation.

10. The system of claim 9, wherein an operating system of the processor is ANDROID operating system.

11. The system of claim 9, wherein the physical activation event is a touch event.

12. The system of claim 9, wherein the processor is configured to detect the physical activation event by monitoring at least one event listener selected from a group consisting of: onTouch, onKeyDown, and onKeyUp.

13. The system of claim 9, wherein the software activation event is a click event.

14. The system of claim 9, wherein the processor is configured to detect the software activation event by monitoring at least one event listener selected from a group consisting of: onClick, onFocusChange, and onLayoutChange.

15. The system of claim 9, wherein the processor is configured to provide a notification to a user responsive to the suspicious activation.

* * * * *